| (12) | United States Patent | (10) Patent No.: | US 9,778,797 B2 |
|---|---|---|---|
| | Lee | (45) Date of Patent: | Oct. 3, 2017 |

(54) TOUCH SCREEN DRIVING APPARATUS AND METHOD FOR IMPROVING TOUCH SENSITIVITY

(71) Applicant: LG DISPLAY CO.,LTD., Seoul (KR)

(72) Inventor: Duk Hyo Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 39 days.

(21) Appl. No.: 14/317,897

(22) Filed: Jun. 27, 2014

(65) Prior Publication Data

US 2015/0002460 A1    Jan. 1, 2015

(30) Foreign Application Priority Data

Jun. 28, 2013 (KR) .................. 10-2013-0075262

(51) Int. Cl.
  *G06F 3/041* (2006.01)
  *G06F 3/044* (2006.01)
(52) U.S. Cl.
  CPC ............ *G06F 3/044* (2013.01); *G06F 3/0416* (2013.01)
(58) Field of Classification Search
  CPC ............................... G06F 3/0416; G06F 3/044
  USPC .................................................. 345/173–174
  See application file for complete search history.

(56) References Cited

U.S. PATENT DOCUMENTS

2011/0084936 A1*  4/2011  Chang .................. G06F 3/0416
                                                      345/174
2011/0267304 A1   11/2011  Simmons et al.
2013/0038570 A1*  2/2013  Seo ........................ G06F 3/0416
                                                      345/174
2013/0050116 A1*  2/2013  Shin ........................ G06F 3/044
                                                      345/173
2013/0278525 A1* 10/2013  Lim ......................... G06F 3/044
                                                      345/173

(Continued)

FOREIGN PATENT DOCUMENTS

| CN | 102236466 A | 11/2011 |
|---|---|---|
| CN | 102955611 A | 3/2013 |
| CN | 102981685 A | 3/2013 |

OTHER PUBLICATIONS

Office Action dated Sep. 2, 2016 for Chinese Application No. 201410302249.8, 13 pages.

*Primary Examiner* — Ram Mistry
(74) *Attorney, Agent, or Firm* — Seed Intellectual Property Law Group LLP

(57) ABSTRACT

A touch screen driving apparatus includes: a touch screen configured to include Tx (transmitting) lines, Rx (receiving) lines crossing the Tx lines, and sensor nodes formed intersections of the Tx lines and the Rx lines; a Tx driver configured to apply driving pulses to the Tx lines in such a manner of that mutually phase-inverted driving pulses are applied to the Tx lines adjacent to each other; first and second Rx drivers each configured to sample sensor node voltage received through the Rx lines, which are coupled with the Tx lines, and convert the sampled voltages into digital data; and a touch controller configured to control the Tx driver and the first and second Rx drivers. The first and second Rx drivers divide the Rx lines and each sample the sensor node voltages through the divided Rx lines, and the Rx line positioned at a boundary between the first and second drivers is commonly connected to the first and second Rx drivers.

13 Claims, 10 Drawing Sheets

(56) References Cited

U.S. PATENT DOCUMENTS

2014/0132541 A1* 5/2014 Miyamoto .............. G06F 3/041
                                                      345/173
2014/0354592 A1* 12/2014 Kang ..................... G06F 3/044
                                                      345/174

* cited by examiner

Fig. 4
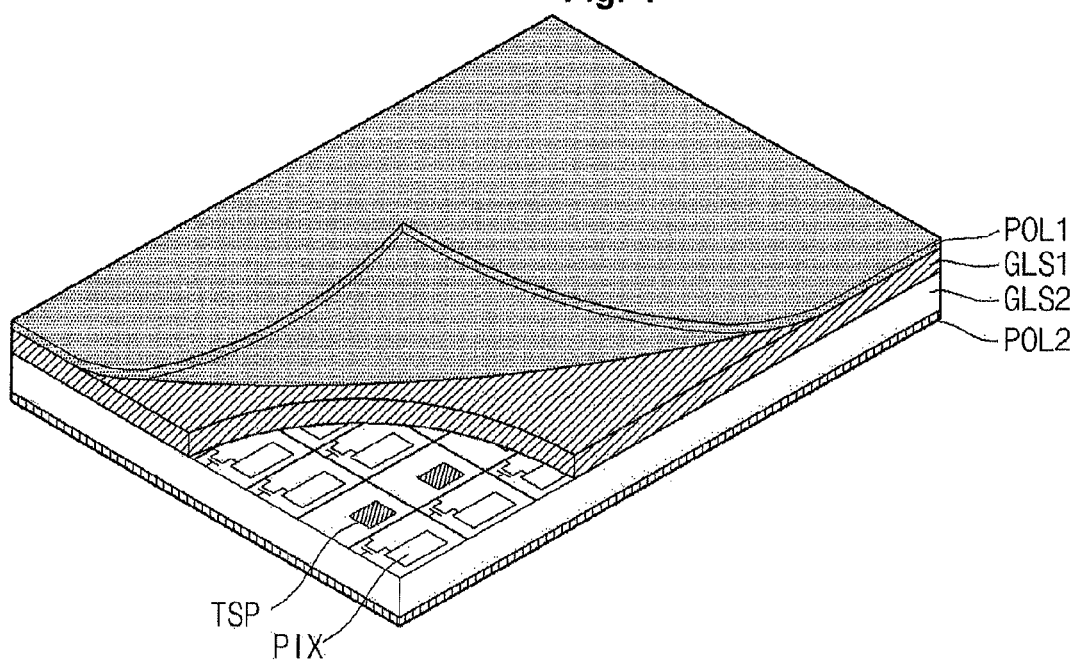
Fig. 5
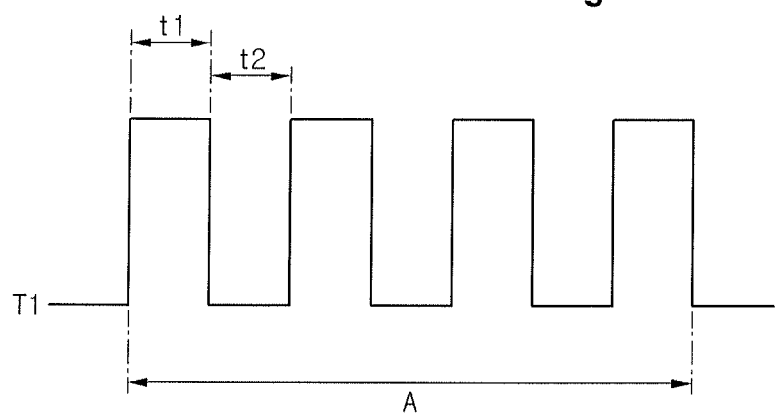
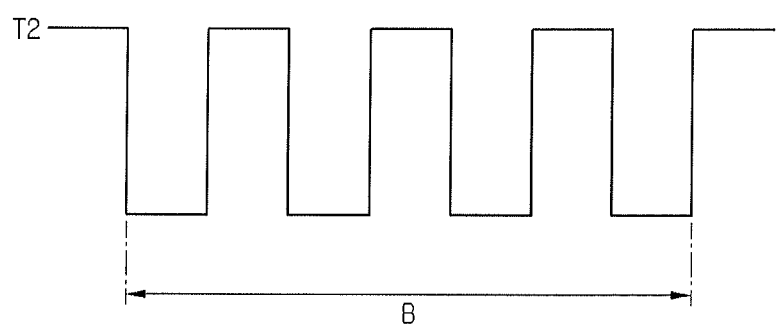

TOUCH SCREEN DRIVING APPARATUS AND METHOD FOR IMPROVING TOUCH SENSITIVITY

The present application claims priority under 35 U.S.C. §119(a) to Korean Patent Application No. 10-2013-0075262 filed on Jun. 28, 2013, which is hereby incorporated by reference in its entirety.

BACKGROUND

Field of the Disclosure

The present application relates to apparatus and method for driving a touch screen.

Description of the Related Art

User interfaces allow user to easily and conveniently control all sorts of electric/electronic appliances. As user interfaces, key pads, keyboards, mice, on-screen displays (OSDs), remote controllers and so on are being used. The remote controller has an infrared light communication function or a radio frequency communication function. Such user interface technologies are continuously developed in order to accommodate the sensitivity of users and the convenience of manipulation. Recently, the user interfaces have evolved into touch user interfaces, voice recognition user interfaces, three-dimensional user interfaces, etc.

The touch user interfaces are being used in portable information appliances, and furthermore widely applied to home appliances. The touch user interface includes a touch screen. As an example of the touch screen, a mutual capacitive touch screen capable of sensing not only a touch but also proximity is used. Such a mutual capacitive touch screen can also detect positions of multi-touches (or multi-proximities).

The mutual capacitive touch screen includes Tx (transmitting) lines, Rx (receiving) lines and sensor nodes formed at intersections of the Tx and Rx lines. Each of the sensor nodes has a mutual capacitance. A touch screen driving apparatus senses a variation of a voltage, which is charged into the sensor node between before and after a touch or proximity, and determines whether or not a conductive object is touched or approximated and the position thereof.

Such a touch screen can be attached to or built into a display panel of a display device. The touch screen is mainly used in a small-sized display panel such as a portable information appliance. As such, a single Tx driver applying scan signals the Tx lines and a single Rx driver receiving touch sensing signals from the Rx lines are disposed on the touch screen.

Recently, the touch screen is also being used in a large-sized display panel. The touch screen used in the large-sized display panel includes far more Tx and Rx lines compared to that used in the portable information appliance. Due to this, it is difficult to drive the touch screen of the large-sized display panel using only the single Tx driver and the single Rx driver.

If a touch screen used in the portable information appliance is applied to the large-sized display panel, a distance between the Tx lines and another distance between the Rx lines must become larger. As such, accurate touch sensing signals cannot be obtained. In other words, a large-sized touch screen suitable for the large-sized display device must be used. In order to maintain or enhance touch sensitivity, the Tx lines and the Rx lines formed on the touch screen must increase. In this case, if only a single Rx driver is used, it must be generated various problems including a signal delay and so on.

Moreover, when a plurality of Rx drivers is used, abnormal touch sensing data is generated in the Rx lines opposite to edges of and boundaries between the Rx drivers.

BRIEF SUMMARY

According to a general aspect of the present embodiment, a touch screen driving apparatus includes: a touch screen configured to include Tx (transmitting) lines, Rx (receiving) lines crossing the Tx lines, and sensor nodes formed intersections of the Tx lines and the Rx lines; a Tx driver configured to apply driving pulses to the Tx lines in such a manner of that mutually phase-inverted driving pulses are applied to the Tx lines adjacent to each other; first and second Rx drivers each configured to sample sensor node voltage received through the Rx lines, which are coupled with the Tx lines, and convert the sampled voltages into digital data; and a touch controller configured to control the Tx driver and the first and second Rx drivers. The first and second Rx drivers divide the Rx lines and each sample the sensor node voltages through the divided Rx lines, and the Rx line positioned at a boundary between the first and second drivers is commonly connected to the first and second Rx drivers.

A touch screen driving method according to another general aspect of the present embodiments is applied to a touch screen which includes Tx (transmitting) lines, Rx (receiving) lines crossing the Tx lines, sensor nodes formed intersections of the Tx lines and the Rx lines, a Tx driver configured to apply driving pulses to the Tx lines, first and second Rx drivers each configured to divide and sample the Rx lines, and a touch controller configured to control the Tx driver and the first and second Rx drivers. The touch screen driving method includes: applying the driving pulses to the Tx lines in such a manner that mutually phase-inverted driving pulses are applied to the Tx lines adjacent to each other; sampling sensor node voltages receiving through the Rx lines which are coupled with the Tx lines; converting the sampled voltages into digital data; and selectively supplying off-set signals to the Rx lines which cause abnormal touch sensing data in a non-touch state of the touch screen.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings:

FIGS. 2 through 4 are perspective views showing various examples of a display panel with a built-in touch screen;

FIG. 5 is a waveform diagram showing mutually phase-inverted driving pulses of a touch screen according to an embodiment of the present disclosure;

DETAILED DESCRIPTION OF THE EMBODIMENTS

Figure 1:
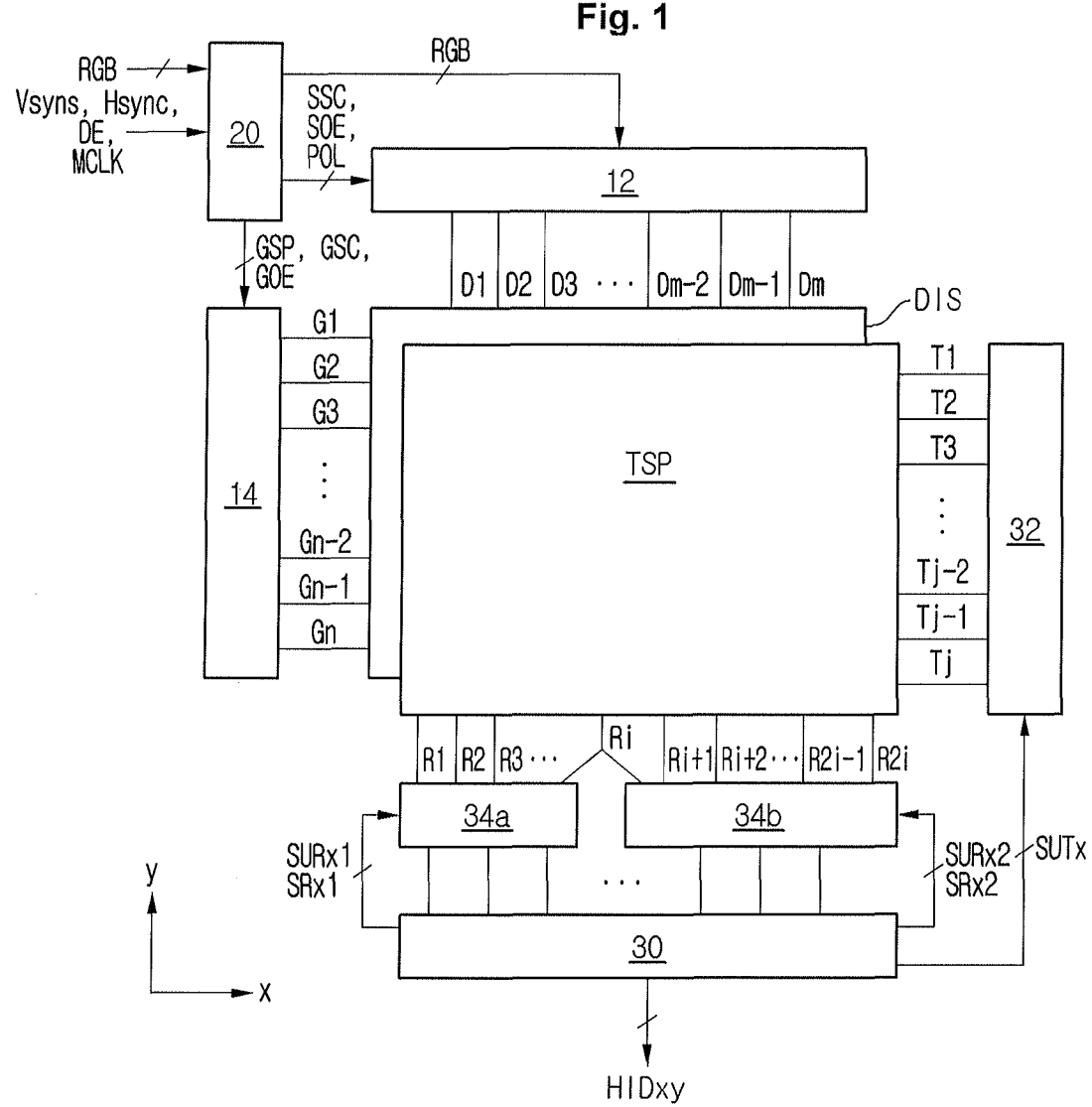
FIG. 1 is a block diagram showing a display device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device may be expressed to be exaggerated for the sake of convenience in the drawings. Wherever possible, the same reference numbers will be used throughout this disclosure including the drawings to refer to the same or like parts.

Figure 2:
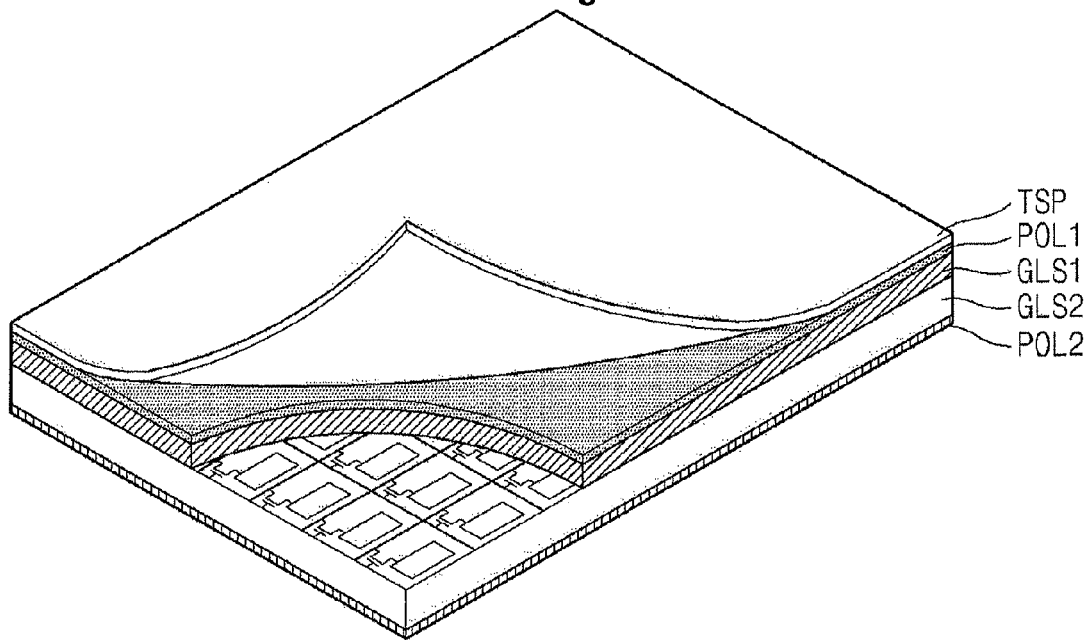
Figure 3:
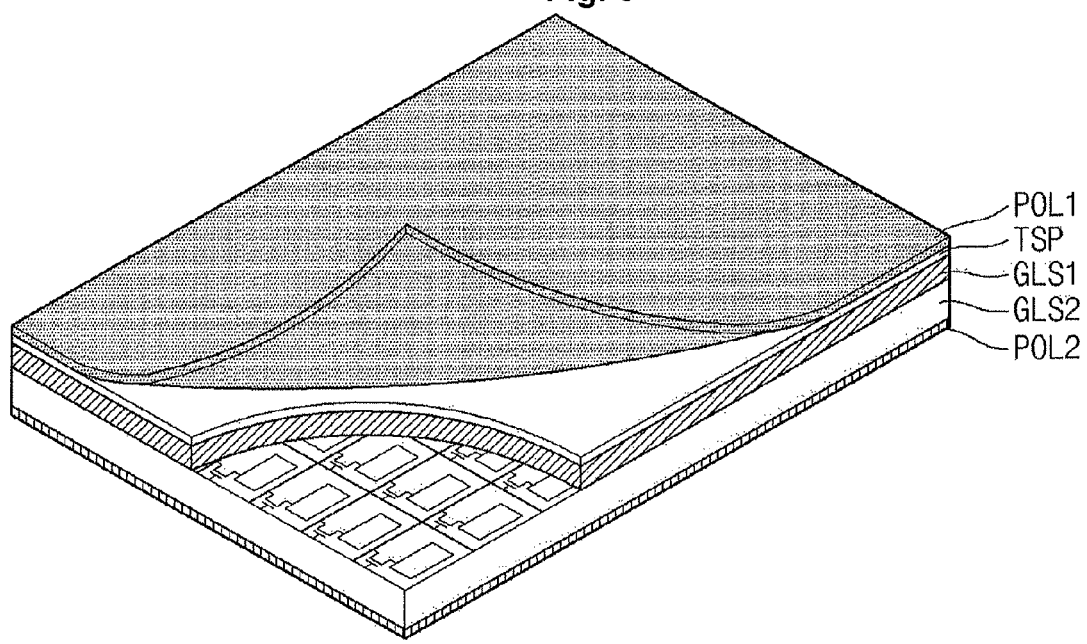

FIG. 1 is a block diagram showing a display device according to an embodiment of the present disclosure. FIGS. 2 through 4 are perspective views showing various examples of a display panel with a built-in touch screen. FIG. 5 is a waveform diagram showing mutually phase-inverted driving pulses of a touch screen according to an embodiment of the present disclosure.

Referring to FIGS. 1 through 5, a display device according to an embodiment of the present disclosure includes: a display panel DIS configured to display images; a gate driver 14 configured to apply gate pulses to the display panel DIS as gate driving signals; a data driver 12 configured to apply data signals to the display panel DIS; and a timing controller 20 configured to control the data driver 12 and the gate driver 14. The display device further includes: a touch screen TSP configured to sense touches; a Tx driver 32 configured to apply sensing signals (or driving pulses) to the touch screen TSP; first and second Rx drivers 34*a* and 34*b* configured to receive the sensing signals (or sampling signals) from the touch screen TSP; and a touch controller 30 configured to control the Rx driver 32 and the first and second Rx drivers 34*a* and 34*b*.

The display device according to an embodiment of the present disclosure can be implemented with a flat panel display device, such as a liquid crystal display (LCD) device, a field emission display (FED) device, a plasma display panel (PDP), an organic light emitting display (OLED) device, an electrophoresis (EPD) device or others, as a basis. Hereinafter, the LCD device will now be explained as an example of the display device according to the present disclosure. However, the display device according to the present disclosure is not limited to this.

The display panel DIS is configured with upper and lower substrates and a liquid crystal layer interposed between the two substrates. The lower substrate of the display panel DIS includes a plurality of data lines D1~Dm and a plurality of gate lines G1~Gn crossing the data lines D1~Dm. The numerals "m" and "n" are natural numbers. The lower substrate of the display panel DIS further includes: a plurality of thin film transistors formed intersections of the data lines D1~Dm and the gate lines G1~Gn; a plurality of pixel electrodes configured to apply data voltages to liquid crystal cells; and storage capacitors connected to the respective pixel electrodes and configured to maintain voltages of the respective liquid crystal cells.

Pixels of the display panel DIS are defined by the data lines D1~Dm and the gate lines G1~Gn crossing each other and arranged in a matrix shape. The liquid crystal cell included in each of the pixels adjusts the transmitting quantity of incident light according to an electric field which is formed by the data voltage applied to the respective pixel electrode and a common voltage applied to a common electrode. Each of the thin film transistors is turned-off in response to the gate pulse from one of the gate lines G1~Gn and transfers the data voltage on one of the data lines D1~Dm to the respective pixel electrode opposite to the respective liquid crystal cell.

The upper substrate of the display panel DIS can include a black matrix, color filters and so on. Alternatively, the lower substrate of the display panel DIS can be formed in a COT (color filter on TFT) structure. In this case, the black matrix and the color filters can be formed on the lower substrate of the display panel DIS.

Also, the display panel DIS includes polarizing plates, alignment films and column spacers. The polarizing plates are attached to outer surfaces of the upper and lower substrates. The alignment films are formed on inner surfaces of the upper and lower substrates in order to set a pretilt angle of liquid crystal molecules. The column spacers are formed between the upper substrate and the lower substrate in order to maintain a cell gap of the liquid crystal cell.

Such a display panel DIS can be implemented in one of a TN (twisted nematic) mode, a vertical alignment (VA) mode, an IPS (in plane switching) mode, a FFS (fringe field switching) mode and so on. In other words, the display panel DIS can be implemented in any one of well-known liquid crystal modes.

The display device can further include a backlight unit (not shown) disposed under the display panel DIS. The backlight unit can be one of an edge type backlight unit and a direct type backlight unit. Such a backlight unit is used to irradiate light onto the display panel DIS.

The data driver 12, the gate driver 14 and the timing controller 20 are used to supply the display panel DIS with the data voltages corresponding to input image, in order to display images.

The data driver 12 converts digital video data RGB into the data voltages using positive/negative analog gamma compensation voltages. The data voltages are applied from the data driver 12 to the data lines D1~Dm. The gate driver 14 sequentially supplies the gate lines G1~Gn on the display panel DIS with the gate pulses (or scan pulses) which are synchronized with the data voltages, in order to select one of the gate lines G1~Gn in which the data voltages are written.

The timing controller 20 generates data timing control signals and scan timing control signals using a vertical synchronous signal Vsync, a horizontal synchronous signal Hsync, a data enable signal DE, a main clock MCLK and so on which are applied from an external host system. The scan timing control signals are used to control the gate driver 14. Such scan timing control signals include a gate start pulse GSP, a gate shift clock GSC, a gate output enable signal GOE and so on. The data timing control signals are used to control the data driver 12. Such data timing control signals include a source sampling clock SSC, a polarity control signal POL, a source output enable signal SOE and so on.

The touch screen TSP can be attached to an upper polarizing plate POL1 of the display panel DIS, as shown in FIG. 3. Alternatively, the touch screen TSP can be interposed between the upper polarizing plate POL1 and the upper substrate GLS1 of the display panel DIS, as shown in FIG. 4. In still another manner, the touch screen TSP can become an in-cell touch screen, which is built into the display panel DIS. In this case, the touch screen DIS includes sensor nodes (not shown), which are defined by crossing Tx lines (not shown) and Rx lines (not shown). The sensor nodes of the touch screen TSP together with a pixel array of the display panel DIS can be formed on the lower substrate GLS2 in an in-cell structure. In FIGS. 2 through 4, "GLS2" and "POL2" indicate the lower substrate and the lower polarizing plate, respectively.

The touch screen TSP includes Tx lines T1~Tj, Rx lines R1~R2$i$ crossing the Tx lines T1~Tj, and sensor nodes of 2×j formed intersections of the Tx line T1~Tj and the Rx lines R1~R2$i$. Wherein, the numeral 'j' is a positive integral number smaller than 'n' and the numeral '2i ' is a positive integral number smaller than 'm'.

A touch screen driving circuit includes the Tx driver 32, the first and second Rx drivers 34$a$ and 34$b$, the touch controller 30 and so on. The touch screen driving circuit supplies the Tx lines T1~Tj with the driving pulses shown in FIG. 6 and samples voltage of the sensor nodes through the Rx lines R1~R2$i$. Also, the touch screen driving circuit converts the sampled voltages of the sensor nodes into a digital data shape using an analog-to-digital converter (hereinafter, 'ADC') and outputs touch row data. The Tx driver 32 and the first and second Rx drivers 34$a$ and 34$b$ can be integrated into a single read-out IC (integrated circuit) chip.

The Tx driver 32 selects Tx channels, which are used for outputting mutually phase-inverted driving pulses, in response to a Tx set-up signal SUTx applied from the touch controller 30. Also, the Tx driver 32 applies the mutually phase-inverted driving pulses A and B to the Tx lines T1 and T2 adjacent to each other through the selected Tx channels as shown in FIG. 5.

If 2$i$ sensor nodes are connected to a single Tx line, the driving pulses A and B can be consecutively applied 2i times to the Tx lines. Thereafter, the driving pulses A and B can be consecutively applied 2$i$ times to next Tx lines.

The first and second Rx drivers 34$a$ and 34$b$ select Rx channels in response to first and second Rx set-up signals SURx1 and SURx2 applied from the touch controller 30 and sample the voltages of the sensor nodes through the Rx lines connected to the selected Rx channels. The voltage of the sensor node can be transferred through an Rx line electrically coupled with the Tx line, which transfers the driving pulse. The first and second Rx drivers 34$a$ and 34$b$ sample the voltages of the sensor nodes by replying to sampling clocks SRx1 and SRx2 from the touch controller 30 and charging the voltages of the sensor nodes, which are received every driving pulse, into sampling capacitors Cc. Each of the first and second drivers 34$a$ and 34$b$ converts the sampled sensor node voltage into a digital data shape using an ADC and applies the converted digital sensor node voltage to the touch controller 30.

The touch controller 30 can be connected to the Tx driver 32 and the first and second Rx drivers 34$a$ and 34$b$ through an interface such as an I2C bus, an SPI (serial peripheral interface), a system bus or others. In order to select the Tx channels, the touch controller 30 applies the Tx set-up signal SUTx to the Tx driver 32.

Also, the touch controller 30 controls a sampling timing of the sensor node voltage and a operation timing of the ADC by applying the Rx sampling clocks SRx1 and SRx2 to the first and second Rx drivers 34$a$ and 34$b$. The Rx sampling clocks SRx1 and SRx2 are used to controls switches of sampling circuits built into the first and second Rx drivers 34$a$ and 34$b$.

Moreover, the touch controller 30 analyzes the touch row data input from the first and second Rx drivers 34$a$ and 34$b$ using a well-known recognition algorism and estimates coordinate values for the touch row data with a variation, between before and after a touch, which is not less than a fixed reference value. The touch controller 30 outputs touch coordinate data HIDxy including the estimated coordinate value. The touch row data with the variation, between before and after a touch, being not less than the fixed reference value is considered as a touch input (or a proximity input). The touch coordinate data HIDxy output from the touch controller 30 is transferred to the external host system. Such a touch controller 30 can be implemented by an MCU (micro controller unit).

The host system can be connected to an external video source appliance, such as navigation system, a set-top box, a DVD (digital video disc) player, a blue ray player, a personal computer, a home theater, a broadcast receiver, a phone system or others, and receive image data from the external video source appliance. Also, the host system includes an SOC (system-on-chip) with a built-in scaler and converts the video data from the external video source appliance into a suitable format for the display panel DIS. Moreover, the host system can execute application programs linked with the coordinate value of the touch coordinate data HIDxy which is applied from the touch controller 30.

Meanwhile, the related art touch screen used in a small-sized display panel such as a mobile phone can be implemented using the Rx driver of a single IC chip. However, a large-sized touch screen used in a large-sized display device cannot be implemented by the Rx driver of a single IC chip due to signal delay and so on.

To address this matter, the present disclosure installs at least two Rx drivers in the large-sized touch screen and allows the Rx drivers to divide the Rx lines and sample the touch sensing signals. As such, the large-sized touch screen can be realized without causing any signal delay.

Figure 6:
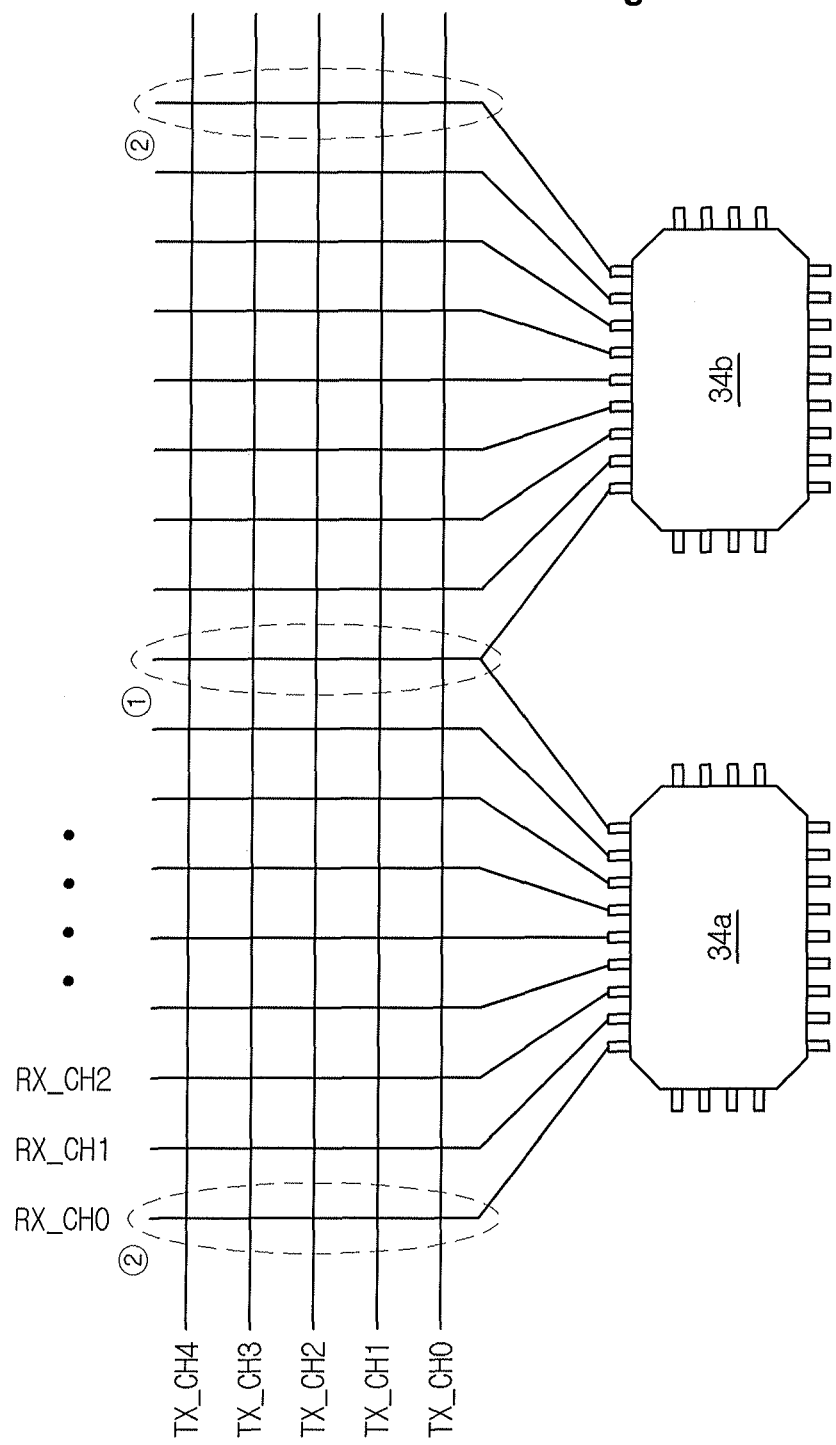
FIG. 6 is a circuit diagram showing connection configuration of first and second Tx drivers and channel lines of a touch screen according to an embodiment of the present disclosure.

FIG. 6 is a circuit diagram showing connection configuration of first and second Tx drivers and channel lines of a touch screen according to an embodiment of the present disclosure.

Referring to FIG. 6, first and second Rx drivers 34$a$ and 34$b$ are arranged in the touch screen TSP attached to the display panel DIS of FIG. 1.

Although they are not shown in the drawings, a plurality of Tx drivers can be arranged in the large-sized touch screen. In this disclosure, a plurality of Rx drivers sampling sensor node voltages from the touch screen TSP, which is attached to a large-sized display panel will now be concentrically explained.

A plurality of Tx lines T1, T2, . . . , and Tj receiving driving pulses (i.e., mutually phase-inverted driving pulses of FIG. 5) from the Tx driver 32 and a plurality of Rx lines R1, R2, . . . , and R2i transferring sensor node voltages are arranged to cross each other. Sensor nodes are formed at intersections of the Tx lines T1~Tj and the Rx lines R1~R2i.

The Rx lines R1~R2i are formed more than those of the touch screen attached to the related art portable appliance, and divisionally connected to the first and second Rx drivers 34a and 34b. However, among the Rx lines R1~R2i, an ith Rx line Ri positioned at the center of the touch screen TSP is commonly connected to the first and second Rx drivers 34a and 34b, in order to enhance touch sensitivity. In other words, the ith Rx line Ri is commonly connected to both of the first and second Rx drivers 34a and 34b without being connected to only one of the first and second Rx drivers 34a and 34b.

This results from the fact that it is difficult to accurately sense a touch input of the touch screen TSP when the ith Rx line Ri positioned at the center of the touch screen TSP is connected to only one of the first and second Rx drivers 34a and 34b.

Figure 11A:
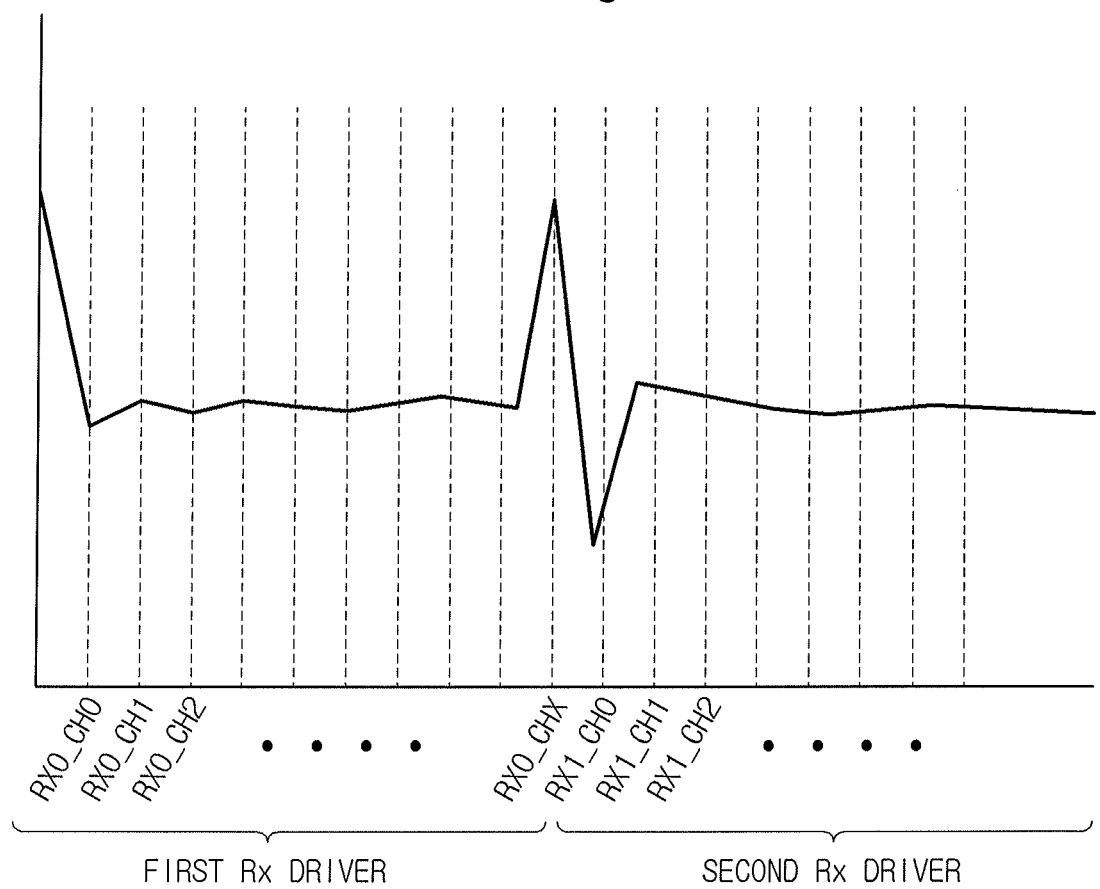
FIGS. 11A and 11B are waveform diagrams illustrating enhanced touch sensitivity, which is obtained by adjusting an off-set signal opposite to a selected channel, according to the present disclosure.

In this manner, arrangement of plural Rx drivers can be applied to the large-sized touch screen TSP. However, because the first and second Rx drivers 34a and 34b different from each other are commonly connected to the ith Rx line Ri at the center of the large-sized touch screen TSP, non-constant touch sensing data must be generated at the sensor nodes on the ith Rx line Ri. In other words, abnormal touch sensing data indicating a touch input of the touch screen TSP can be generated in a state that the touch screen TSP is not touched, as shown in FIG. 11A.

Figure 7A:
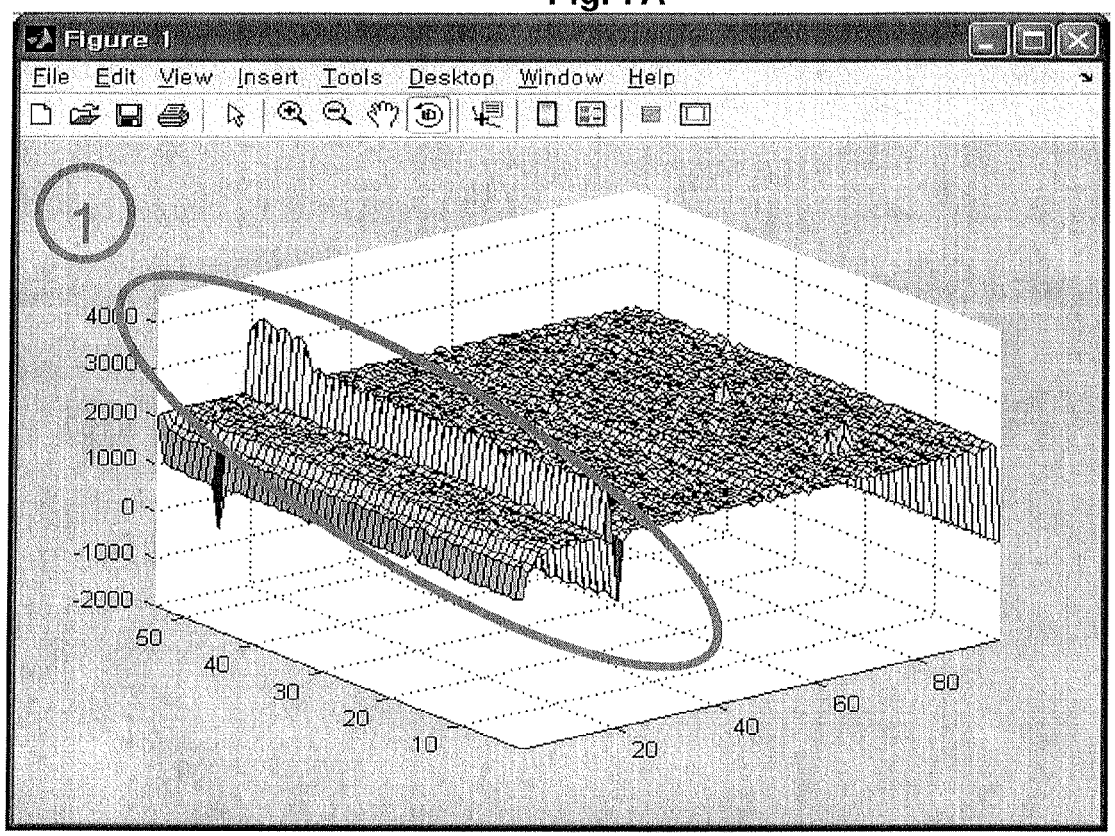
FIGS. 7A and 7B data sheets showing abnormal data waveforms, which are sensed from regions ① and ② in FIG. 6.
Figure 7B:
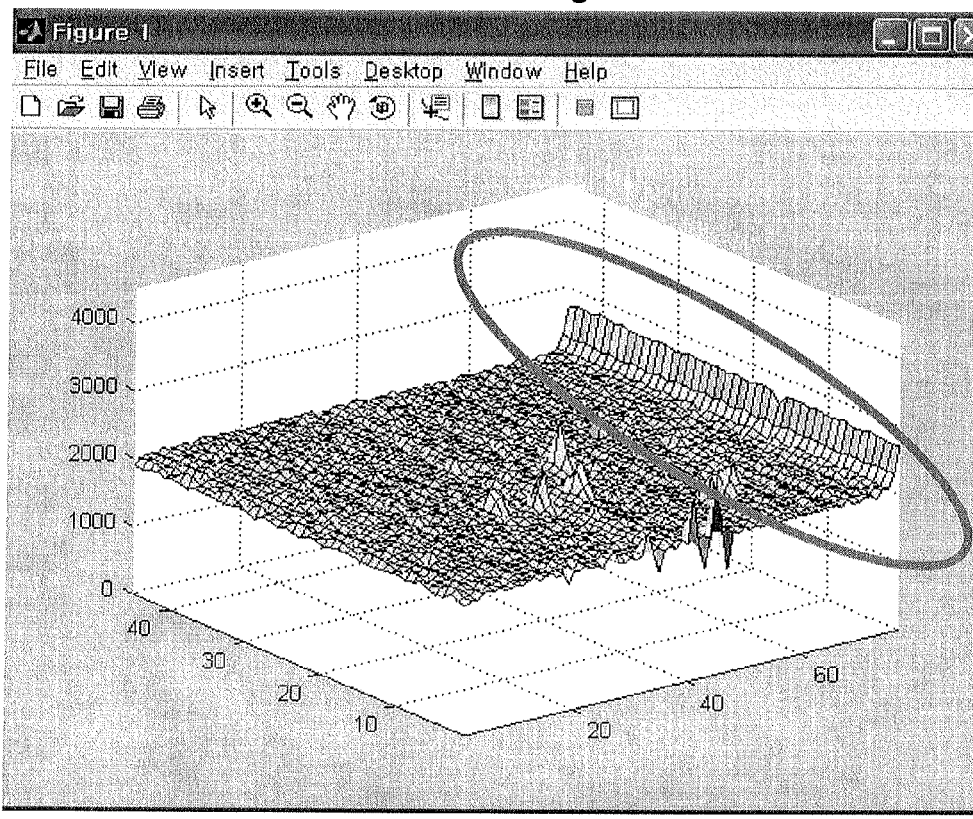

FIGS. 7A and 7B data sheets showing touch sensing data waveforms, which are sensed from regions ① and ② in FIG. 6.

Referring to FIGS. 7A and 7B, ununiformed touch sensing data is sensed in the ith Rx line region (i.e., region ①), which is positioned at the center of the touch screen TSP and commonly connected to the first and second Rx drivers 34a and 34b, in spite of a state that the touch screen TSP is not touched, because the first and second Rx drivers 34a and 34b are different from each other. Also, ununiformed touch sensing data is sensed in edge regions of the first and second Rx drivers 34a and 34b.

In other words, the plurality of Rx drivers arranged in the large-sized touch panel TSP can enhance touch sensitivity and prevent the problems of signal delay and so on. However, the arrangement of the plural Rx drivers causes the generation of abnormal touch sensing data signals to be sensed from fixed Rx lines.

In order to eliminate the abnormal touch sensing data signals which can be additionally caused by arrangement of the plural Rx drivers used to enhance touch sensitivity of the touch screen attached the large-sized display panel, the present disclosure allows a selectively adjusted off-set signal to be applied to channels in which a sampling operation are being executed.

In other words, the off-set signal having the same shape as the abnormal touch sensing data is applied to channel which generates the abnormal touch sensing data in the non-touch state of the touch screen. In accordance therewith, the present disclosure can allow the abnormal touch sensing data indicating a touch input to be not sensed.

Figure 8:
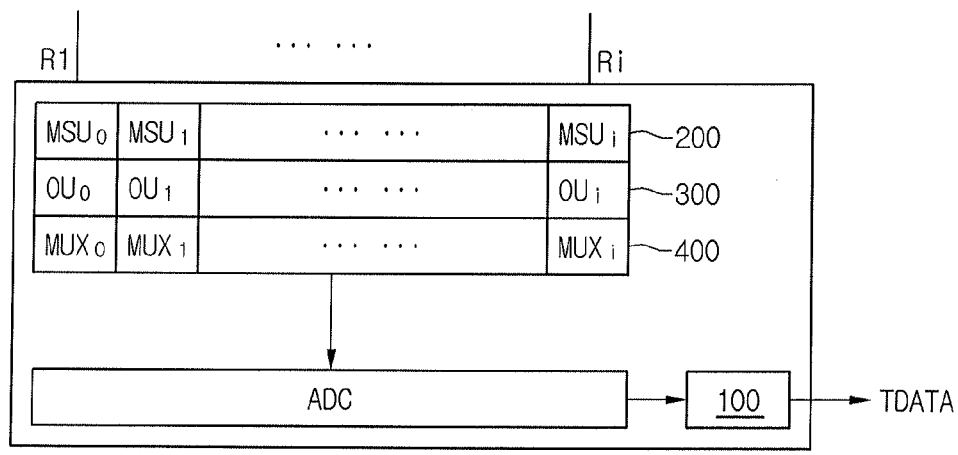
FIG. 8 is a detailed block diagram showing configuration of an Rx driver according to an embodiment of the present disclosure.
Figure 9A:
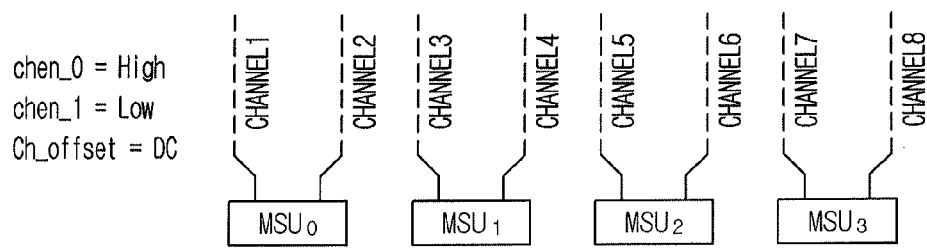
FIGS. 9A and 9B are circuit diagrams illustrating channel sensing operations of sensing units which are arranged in an Rx driver.
Figure 9B:
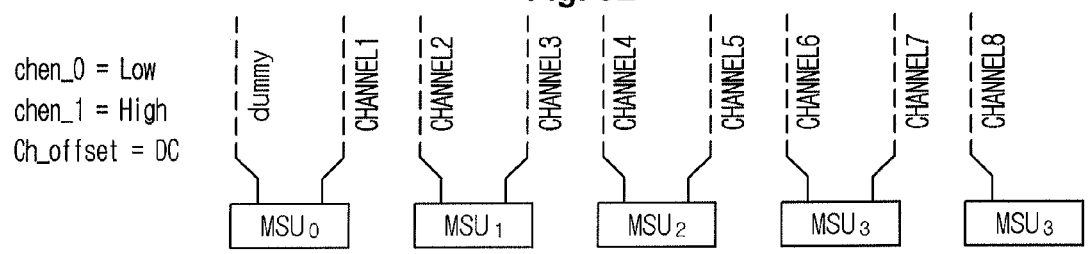

FIG. 8 is a detailed block diagram showing configuration of a first Rx driver of Rx drivers according to an embodiment of the present disclosure. FIGS. 9A and 9B are circuit diagrams illustrating channel sensing operations of sensing units which are arranged in an Rx driver.

Although the first Rx driver will now be concentrically explained, the present disclosure can be applied to the plurality of Rx drivers in the same manner as to the first Rx driver.

Referring to FIGS. 8, 9A and 9B, the first Rx driver 34a includes: a sensing portion 200 configured to sample sensor node voltages from sensor nodes on the touch screen TSP; an off-set supplier 300 configured to supply adjusted off-set signals to the Rx lines R1~Ri through the sensing portion 200; and a multiplex portion 400 configured to selectively supply the off-set supplier 300 with off-set voltages different from one another. Also, the first Rx driver 34a includes an ADC configured to convert the sensor node voltages received from the sensing portion 200 into digital signals, and a data compensator 100 configured to compensate the data signals output from the ADC.

The sensing portion 200 includes a plurality of sensing units MSU0~MSUi, and the off-set supplier 300 includes a plurality of off-set units OU0~OUi. The sensing units MSU0~MSUi are opposite to the Rx lines connected to the first Rx driver 34a. Similarly, the off-set units OU0~OUi are opposite to the Rx lines connected to the first Rx driver 34a.

The data compensator 100 executes a touch row data compensation method and recovers sensor node voltages, which are omitted when the sensor node voltages are generated by applying the mutually phase-inverted driving pulses to Tx lines adjacent to each other, thereby generating final touch row data TDATA. The omitted sensor node voltages can be recovered by performing an integral operation for the other sensor node voltages.

Each of the sensing units MSU0~MSUi included in the sensing portion 200 of the first Rx driver 34a samples the sensor node voltages from two channels among channels (channel1, channel2, . . . ) which are formed by the Rx lines R1~Ri.

In detail, each of the sensing units MSU samples alternately two channels. In other words, each of the sensing units MSU enables high and low signals in accordance with the driving pulses shown in FIG. 5 to be alternately applied to each of the channels, and samples the sensor node voltages in such a manner as to sense a varied voltage at the sensor node.

The related art Rx driver allows a direct current voltage with a constant electric potential to be applied to all the channels as the off-set signal while the sensor node voltages are be sensed by the sensing portion 200. In different manner, if the plurality of Rx drivers is arranged in the large-sized touch screen as described in the present disclosure, abnormal touch sensing data must be generated in Rx lines opposite to a boundary between the Rx drivers and edges of the Rx drivers.

However, the present disclosure allows not only the plurality of Rx drivers to be arranged in the large-sized touch screen but also the off-set signals with different electric potential levels to be periodically applied to on the touch screen. Therefore, touch sensitivity of the large-sized touch screen can be enhanced, and furthermore the generation of abnormal touch sensing data due to the plurality of Rx drivers can be prevented.

In other words, an off-set signal adjusted into a high or low level instead of a fixed DC voltage is applied to channels, which can cause the abnormal touch sensing data, via the sensing units of the Rx driver.

Figure 10:
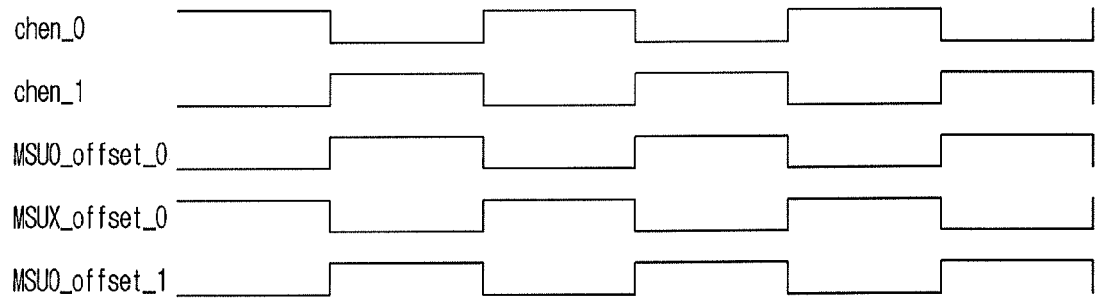
FIG. 10 is a waveform diagram illustrating an operation of providing adjusted off-set signals opposite to channels according to the present disclosure.
Figure 11B:
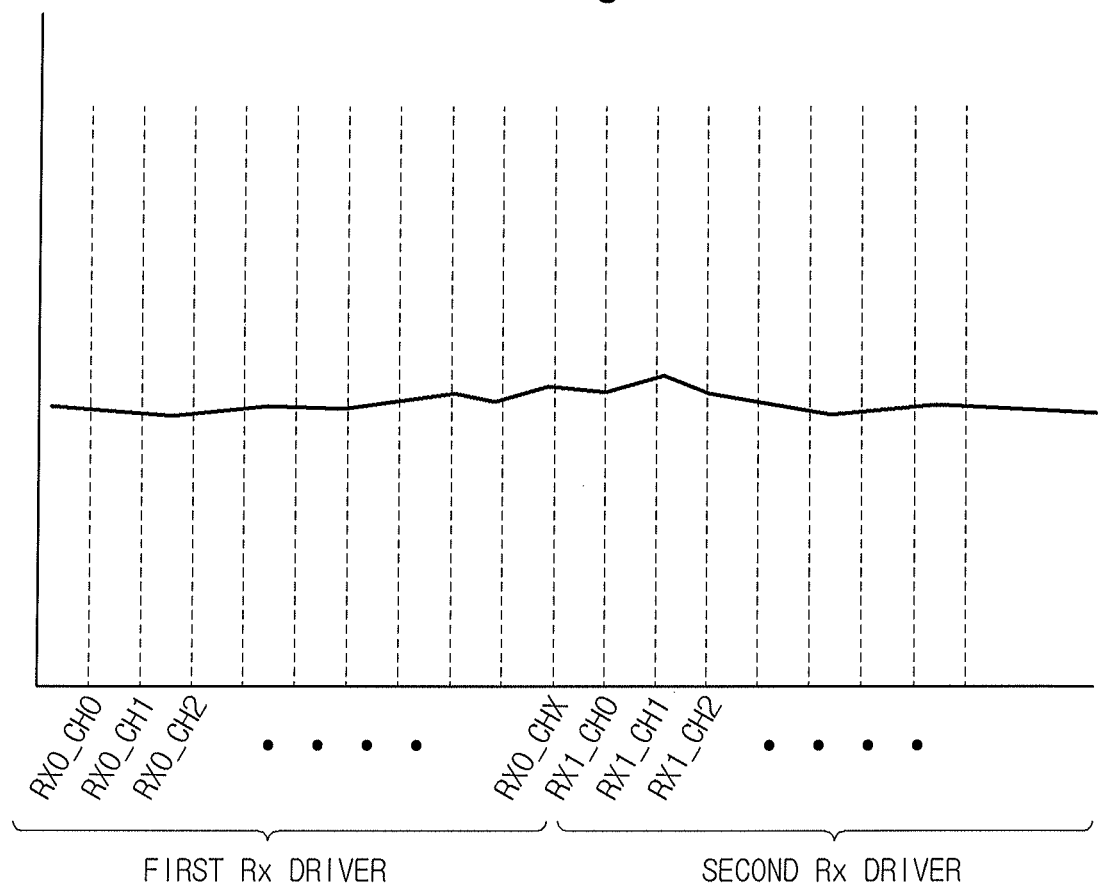

FIG. 10 is a waveform diagram illustrating an operation of providing adjusted off-set signals opposite to channels according to the present disclosure. FIGS. 11A and 11B are waveform diagrams illustrating enhanced touch sensitivity, which is obtained by adjusting an off-set signal opposite to a selected channel, according to the present disclosure.

Referring to FIGS. 10, 11A and 11B, the first Rx driver 34a is connected to first through ith Rx lines R1~Ri and the second Rx driver 34b is connected to ith through (2i)th Rx lines R1~R2i. In other words, the ith Rx line Ri positioned at the center of the touch screen TSP is commonly connected to the first and second drivers 34a and 34b. As seen from FIG. 11A, it is evident that an abnormal touch sensing data is sensed at the central channel region RX1_CH0 of the touch screen. In other words, the abnormal touch sensing data is generated in the ith Rx line Ri which is commonly connected to the first and second Rx drivers 34a and 34b.

Also, the abnormal touch sensing data is sensed in the Rx lines (i.e., first and (2i)th Rx lines R1 and R2i) opposite to edge of the first and second Rx drivers 34a and 34b. In other words, although the touch screen is touched, the abnormal touch sensing data is generated in fixed channel regions of the touch screen due to a physical structure and a circuit connection configuration.

As shown in FIG. 11A, the abnormal touch sensing data with an overshoot voltage is sensed in a $0^{th}$ channel of an edge of the first Rx driver 34a. Although it is not shown in the drawing, the abnormal touch sensing data is also sensed in a (2i)th channel of an edge of the second Rx driver 34b opposite to the (2i)th Rx line R2i.

As shown in FIG. 10, when a high voltage is sensed in the first channel of the first Rx driver 34a, the off-set signal with a high level is applied through the first off-set unit MSU0 of the first Rx driver 34a. On the contrary, if a low voltage is sensed the first channel of the second Rx driver 34b, the off-set signal with a low level is applied through the first off-set unit MSU0 of the second Rx driver 34b. In accordance therewith, the abnormal touch sensing data generated in a state that any touch event is not generated can be eliminated.

In other words, the off-set signals different from one another are applied to the channels of desired regions. As such, the abnormal touch sensing data caused by the physical structure in boundaries between and edges of the plural Rx drivers, which are arranged in the large-sized touch screen, without any touch event during the sensing operation can be eliminated. In accordance therewith, touch sensitivity of the large-sized touch screen can be enhanced.

Figure 12:
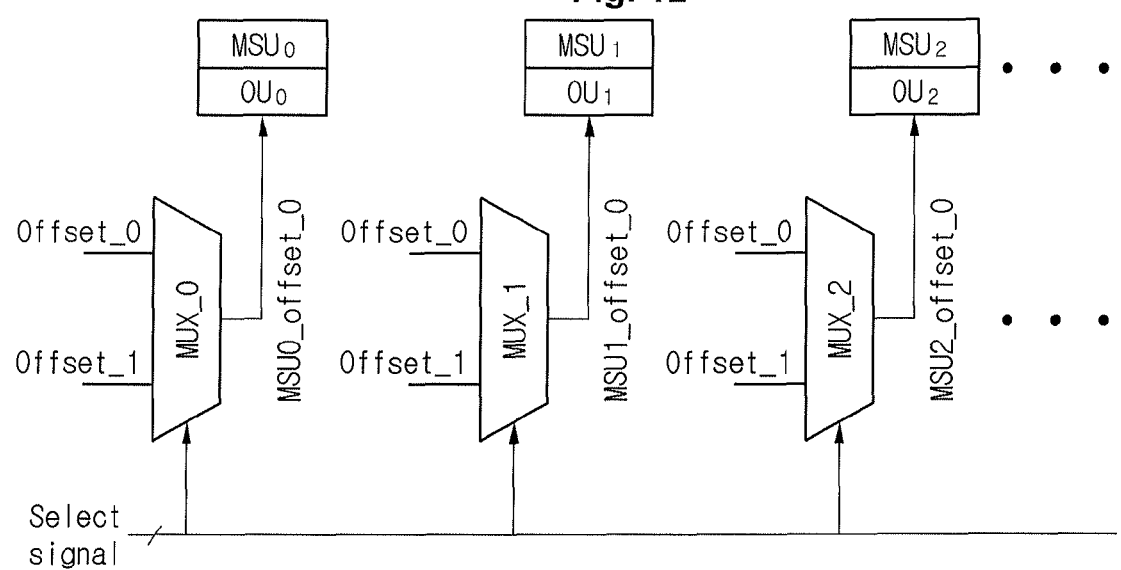
FIG. 12 is a detailed circuit diagram illustrating an operation that off-set signals are selectively applied to channels by means of an Rx driver according to the present disclosure.

FIG. 12 is a detailed circuit diagram illustrating an operation that off-set signals are selectively applied to channels by means of an Rx driver according to the present disclosure.

Referring to FIGS. 1 and 12, the sensing portion includes a plurality of sensing units MSU0~MSUi and the off-set supplier 300 includes a plurality of off-set units OU0~OUi arranged opposite to the plurality of sensing units MSU0~MSUi, like the Rx driver shown in FIG. 8.

As explained in FIG. 11A, the present disclosure selectively provides the off-set signals adjusted by the off-set units OU0~OUi, in order to eliminate the abnormal touch sensing data caused in a state that the large-sized touch screen is not touched.

To this end, the multiplex portion configured with a plurality of multiplexers MUX0~MUXi each selecting one of the adjusted off-set signals Off Set_0 and Off Set_1 must be controlled by a channel selection signal applied from the touch controller 30. In detail, the multiplex portion 400 selects a channel, which causes the abnormal touch sensing data, in response to the channel selection signal and allows one of the adjusted off-set signals Off Set_0 and Off Set_1 to be applied to the selected channel.

In other words, the touch screen driving apparatus and method according to the present disclosure can eliminate the abnormal data, which is sensed in a non-touch state of the touch screen, by adjusting the off-set signal. As such, touch sensitivity of the large-sized touch screen can be enhanced.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen driving apparatus comprising:
    a touch screen configured to include Tx (transmitting) lines, Rx (receiving) lines crossing the Tx lines, and sensor nodes at intersections of the Tx lines and the Rx lines;
    a Tx driver configured to apply driving pulses to the Tx lines in such a manner that mutually phase-inverted driving pulses are applied to the Tx lines adjacent to each other;
    first and second Rx drivers each configured to sample sensor node voltage received through the Rx lines, which are coupled with the Tx lines, and convert the sampled voltages into digital data; and
    a touch controller configured to control the Tx driver and the first and second Rx drivers,
    wherein the first and second Rx drivers divide the Rx lines and each sample the sensor node voltages through the divided Rx lines, and only the Rx line positioned at a boundary between the first and second drivers is commonly and directly connected to the first and second Rx drivers, and
    wherein each of the first and second Rx drivers are configured to selectively apply off-set signals with different electric potential levels to the Rx lines in response to a channel selection signal applied from the touch controller.

2. The touch screen driving apparatus of claim 1, wherein each of the first and second Rx drivers includes:
    a sensing portion configured to sample the sensor node voltages from the Rx lines;
    an off-set supplier configured to apply selected off-set signals to the Rx lines which cause an abnormal touch sensing data in a non-touch state of the touch screen;
    a multiplex portion configured to selectively apply the off-set signals to the off-set supplier; and
    an analog-to-digital converter (ADC) configured to convert the sensor node voltages sampled by the sending portion into the digital data.

3. The touch screen driving apparatus of claim 2, wherein each of the first and second Rx drivers further includes a data compensator configured to recover omitted sensor node voltages, which are omitted by the driving pulse applied to the Tx lines, by performing an integral operation for the converted digital data.

4. The touch screen driving apparatus of claim 2, wherein the sensing portion includes a plurality of sensing units opposite to the divided Rx lines.

5. The touch screen driving apparatus of claim 2, wherein the off-set supplier includes a plurality of off-set units opposite to the divided Rx lines.

6. The touch screen driving apparatus of claim 2, wherein the off-set signals applied to the Rx lines through the off-set supplier periodically have different electric potential levels from one another.

7. A method of driving a touch screen which includes Tx (transmitting) lines, Rx (receiving) lines crossing the Tx lines, sensor nodes formed intersections of the Tx lines and the Rx lines, a Tx driver configured to apply driving pulses to the Tx lines, first and second Rx drivers each configured to divide and sample the Rx lines, and a touch controller configured to control the Tx driver and the first and second Rx drivers, wherein only the Rx line positioned at a boundary between the first and second drivers is commonly and directly connected to the first and second Rx drivers, the method comprising:
  applying the driving pulses to the Tx lines in such a manner that mutually phase-inverted driving pulses are applied to the Tx lines adjacent to each other;
  sampling sensor node voltages receiving through the Rx lines which are coupled with the Tx lines;
  converting the sampled voltages into digital data; and
  selectively supplying off-set signals to the Rx lines which cause abnormal touch sensing data in a non-touch state of the touch screen,
  wherein the selective supply of the off-set signals enables the first and second Rx drivers to selectively apply the off-set signals with different electric potential levels to the Rx lines in response to a channel selection signal applied from the touch controller.

8. The method of claim 7, wherein each of the off-set signals has a waveform being periodically varied in electric potential level.

9. A touch screen driving apparatus comprising:
  a touch screen configured to include Tx (transmitting) lines, Rx (receiving) lines crossing the Tx lines, and sensor nodes at intersections of the Tx lines and the Rx lines;
  a Tx driver configured to apply driving pulses to the Tx lines in such a manner that mutually phase-inverted driving pulses are applied to the Tx lines adjacent to each other;
  first and second Rx drivers each configured to sample sensor node voltage received through the Rx lines, which are coupled with the Tx lines, and convert the sampled voltages into digital data; and
  a touch controller configured to control the Tx driver and the first and second Rx drivers,
  wherein the first and second Rx drivers divide the Rx lines and each sample the sensor node voltages through the divided Rx lines, and the Rx line positioned at a boundary between the first and second drivers is commonly connected to the first and second Rx drivers,
  wherein each of the first and second Rx drivers includes:
    a sensing portion configured to sample the sensor node voltages from the Rx lines;
    an off-set supplier configured to apply selected off-set signals to the Rx lines which cause an abnormal touch sensing data in a non-touch state of the touch screen;
    a multiplex portion configured to selectively apply the off-set signals to the off-set supplier; and
    an analog-to-digital converter (ADC) configured to convert the sensor node voltages sampled by the sending portion into the digital data.

10. The touch screen driving apparatus of claim 9, wherein each of the first and second Rx drivers further includes a data compensator configured to recover omitted sensor node voltages, which are omitted by the driving pulse applied to the Tx lines, by performing an integral operation for the converted digital data.

11. The touch screen driving apparatus of claim 9, wherein the sensing portion includes a plurality of sensing units opposite to the divided Rx lines.

12. The touch screen driving apparatus of claim 9, wherein the off-set supplier includes a plurality of off-set units opposite to the divided Rx lines.

13. The touch screen driving apparatus of claim 9, wherein the off-set signals applied to the Rx lines through the off-set supplier periodically have different electric potential levels from one another.

* * * * *